United States Patent [19]

Atsumi et al.

[11] 3,977,380

[45] Aug. 31, 1976

[54] STARTER ASSIST DEVICE FOR INTERNAL COMBUSTION ENGINES

[75] Inventors: Minoru Atsumi; Yoshikatsu Nakano, both of Kawagoe; Yasumichi Ohhama, Mitaka, all of Japan

[73] Assignee: Honda Giken Kogyo Kabushiki Kaisha, Tokyo, Japan

[22] Filed: Sept. 10, 1975

[21] Appl. No.: 612,213

Related U.S. Application Data

[63] Continuation of Ser. No. 447,239, March 1, 1974, abandoned.

[30] Foreign Application Priority Data

Mar. 6, 1973   Japan .................................. 48-27285

[52] U.S. Cl. ..................... 123/179 G; 123/32 SP; 123/32 ST; 123/124 A; 123/124 B
[51] Int. Cl.² ........................................... F02M 23/04
[58] Field of Search ........ 123/124 R, 124 A, 124 B, 123/179 G, 119 F, 32 ST, 32 SP, 75 B

[56] References Cited
UNITED STATES PATENTS

| 1,470,948 | 10/1923 | VanHorn | 123/124 A |
| 1,605,165 | 11/1926 | Brotz | 123/124 A |
| 1,721,633 | 7/1929 | Matteson | 123/124 A |
| 1,913,131 | 6/1933 | Sisson | 123/124 A |
| 2,230,184 | 1/1941 | Horton | 123/179 G |
| 2,342,046 | 2/1944 | Greene | 123/124 A |
| 2,905,165 | 9/1959 | Hall | 123/179 G |
| 3,043,286 | 7/1962 | Blomberg | 123/124 B |
| 3,113,561 | 12/1963 | Heintz | 123/32 SP |
| 3,363,611 | 1/1968 | VonSeggern | 123/32 SP |
| 3,508,530 | 4/1970 | Clawson | 123/32 ST |

*Primary Examiner*—Charles J. Myhre
*Assistant Examiner*—Daniel J. O'Connor
*Attorney, Agent, or Firm*—Lyon & Lyon

[57] ABSTRACT

A starter assist device for internal combustion engines which includes a supplemental air supply passage for the intake manifold arranged to bypass the carburetor, and a thermo-sensitive switch incorporated in the starter circuit and arranged to cause introduction of supplemental air into the intake manifold when the engine is started under conditions in which the engine is warm so that an oversupply of fuel is avoided, and to close off the supplemental air when the engine is started when cold to provide an adequate amount of fuel.

2 Claims, 1 Drawing Figure

U.S. Patent   Aug. 31, 1976   3,977,380
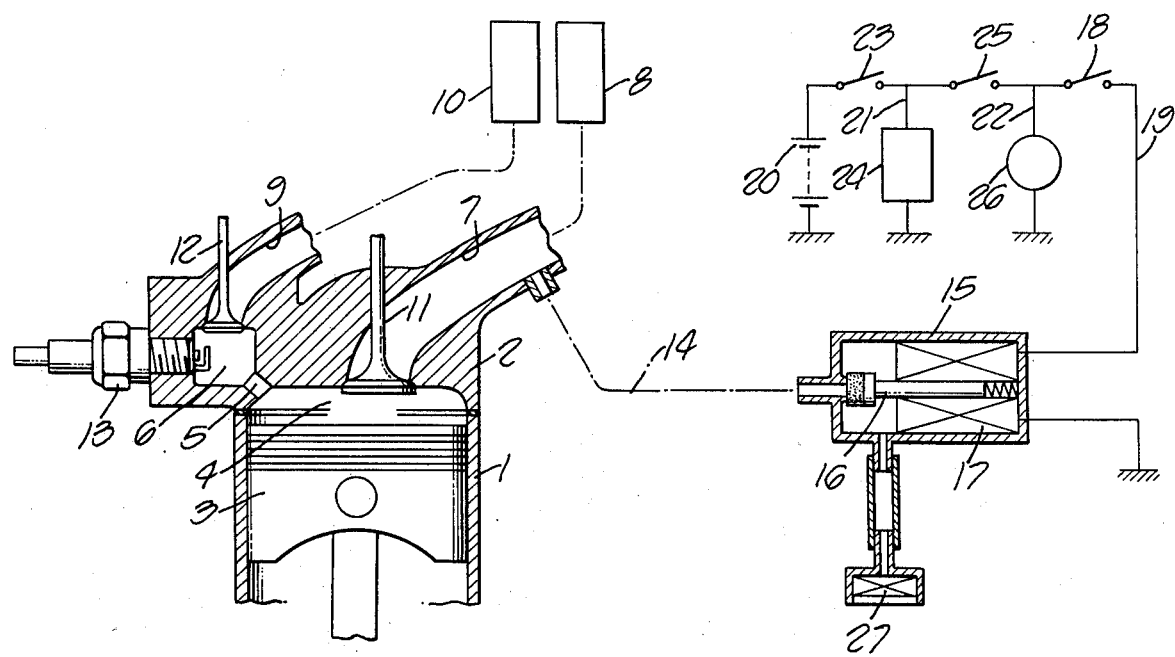

STARTER ASSIST DEVICE FOR INTERNAL COMBUSTION ENGINES

This is a continuation of application Ser. No. 447,239, filed March 1, 1974, now abandoned.

When a conventional internal combustion engine is stopped under conditions in which the engine is warm, unvaporized fuel previously deposited on the walls of the intake passages is vaporized. If the engine is restarted while the engine is still warm, the vaporized mixture in the intake passages mixes with the new air-fuel mixture supplied from the carburetor producing an over-rich mixture which is richer than the air-fuel ratio suitable for ignition of the mixture within the combustion chamber, resulting in poor restart of the engine and a wasting of fuel.

The present invention is directed to a starter assist device for internal combustion engines which includes a means for supplying supplemental air to lean the rich mixture in the combustion chamber, and a control connected with the engine starter system which is provided with a thermo-sensitive means for supplying supplemental air when the engine is started while warm or hot, and shutting off such supply if the engine is started when cold.

The present invention is particularly suited for use with an internal combustion engine having a main combustion chamber served with a lean fuel-air mixture and an auxiliary combustion chamber served with a rich fuel-air mixture, the auxiliary combustion chamber being connected with the main combustion chamber by a torch passage through which a previously ignited mixture is injected into the main combustion chamber to ignite the fuel-air mixture present therein.

Other and more detailed objects and advantages will appear hereinafter.

In the drawings:

The single FIGURE constituting the drawing shows fragmentarily and in section a head and a cylinder of the type of internal combustion engine utilizing main and auxiliary combustion chambers, and similarly in section a solenoid valve for supplying supplemental air; the FIGURE also indicating diagrammatically corresponding carburetors for the combustion chambers, an ignition circuit, a starter circuit, and a thermo-sensitive switch for control of the solenoid valve.

The present invention is illustrated as arranged for inclusion in an internal combustion engine having an engine block 1 covered by an engine head 2. The engine block 1 is provided with one or more cylinders each of which receives a piston 3, forming with the head 2 a main combustion chamber 4. The chamber 4 is connected by a restricted torch nozzle 5 to an auxiliary combustion chamber 6 located in the engine head 2.

The main combustion chamber 4 is supplied with a lean fuel-air mixture through a main intake passage 7 connected to a main carburetor 8. The main combustion chamber 4 is provided with a conventional exhaust passage, not shown. The auxiliary combustion chamber 6 is supplied with a rich fuel-air mixture through an auxiliary intake passage 9 connected to an auxiliary carburetor 10.

The main and auxiliary chambers are provided, respectively, with a main intake valve 11 and an auxiliary intake valve 12 both connected to suitable operating mechanisms, not shown. A spark plug 13 is provided in the auxiliary combustion chamber 6.

In the exercise of the present invention, the main intake passage 7 is supplied with fuel free supplemental air through a passage 14 connected to a valve 15 having a movable valve member 16 including an armature fitted within a solenoid 17.

A thermo-sensitive switch 18 is incorporated in the engine ignition system and is connected to the solenoid 17 by an energizing line 19. The ignition system includes a battery 20 connected through switches 23 and 25 and lines 21 and 22 to an ignition device 24 and a starter motor 26, respectively.

The supplemental air valve 15 is provided with an inlet having a suitable air cleaner 27.

Operation of the starter assist device is as follows: The thermo-sensitive switch 18 is so located as to be heated by the internal combustion engine and is responsive to the engine temperature so as to occupy an open position when the engine is cold and to occupy a closed position when the engine becomes heated above a predetermined temperature. The supplemental air valve 15 is normally closed.

In order to start the engine, the ignition switch 23 and starter switch 25 must be closed. If the engine is cold, switch 18 is open so that the supplemental air valve 15 is not operated and thus remains in its normally closed position. When the engine is heated above a predetermined temperature, and is started by closure of switches 23 and 25, switch 18 occupies a closed position causing supplemental air to be admitted to the main intake passage 7. A part of the lean mixture introduced into the main combustion chamber enters into the auxiliary combustion chamber through the torch nozzle during compression stroke and makes the mixture in said auxiliary chamber leaner to the extent of ignitable mixture ratio. As a result, the engine starts more readily and fuel is not wasted.

Having fully described our invention it is to be understood that we are not to be limited to the details herein set forth but that our invention is of the full scope of the appended claims.

We claim:

1. A starter assist device in an internal combustion piston engine having a main combustion chamber, an auxiliary combustion chamber, a main carburetor and main intake passage to supply a lean air-fuel mixture for the main combustion chamber, an auxiliary carburetor and an auxiliary intake passage to supply a rich air-fuel mixture for the auxiliary combustion chamber, ignition means for the auxiliary combustion chamber, a torch passage communicating from the auxiliary to the main combustion chamber, and an engine starter means, said starter assist device comprising: a supplemental air supply means connected to the main intake passage but not to the auxiliary intake passage; a valve for controlling the supplemental air supply means; and a thermosensitive means exposed to engine temperatures and operatively connected to the engine starter means to cause said valve to open during starting of the engine when its temperature is above a predetermined value, thereby to supply supplemental air to the main intake passage only, some of the supplemental air reaching the auxiliary chamber through the torch passage during the compression stroke to cause leaning of the mixture in the auxiliary chamber prior to ignition.

2. A starter device as defined in claim 1, wherein: said valve is a solenoid valve normally occupying a closed position; and the thermosensitive means includes a switch which is closed when the engine temperature is above said predetermined value.

* * * * *